(12) United States Patent
Nakaya et al.

(10) Patent No.: US 7,615,272 B2
(45) Date of Patent: Nov. 10, 2009

(54) COINJECTION STRETCH BLOW MOLDED CONTAINER

(75) Inventors: Masakazu Nakaya, Kurashiki (JP); Shinji Tai, Kurashiki (JP); Hiroyuki Shimo, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 1259 days.

(21) Appl. No.: 10/367,833

(22) Filed: Feb. 19, 2003

(65) Prior Publication Data

US 2004/0013893 A1 Jan. 22, 2004

(30) Foreign Application Priority Data

Feb. 15, 2002 (JP) ............... 2002-037820

(51) Int. Cl.
*B32B 1/00* (2006.01)
*B32B 1/02* (2006.01)
*B32B 1/08* (2006.01)

(52) U.S. Cl. .............. 428/35.7; 428/34.1; 428/35.9; 428/36.9; 428/36.91; 428/36.6

(58) Field of Classification Search ............... 428/35.7, 428/35.9, 36.6, 36.7, 34.1, 36.9, 36.91
See application file for complete search history.

(56) References Cited

U.S. PATENT DOCUMENTS

| | | | |
|---|---|---|---|
| 4,535,901 A | 8/1985 | Okudaira et al. | 708/629 |
| 4,590,131 A | 5/1986 | Yazaki et al. | 428/516 |
| 4,646,925 A | 3/1987 | Nohara | 215/1 |
| 4,904,509 A | 2/1990 | Nohara et al. | 428/36.6 |
| 6,174,949 B1 | 1/2001 | Ninomiya et al. | 524/404 |
| 6,395,358 B1 | 5/2002 | Tai et al. | 428/36.7 |
| 6,451,967 B1 * | 9/2002 | Ninomiya et al. | 528/503 |

FOREIGN PATENT DOCUMENTS

| | | |
|---|---|---|
| EP | 0 949 056 | 10/1999 |
| EP | 949056 A2 * | 10/1999 |
| EP | 1 120 223 | 8/2001 |
| JP | 11-43573 | 2/1999 |
| JP | 11-348194 | 12/1999 |
| JP | 2001-277341 | 10/2001 |

OTHER PUBLICATIONS

U.S. Appl. No. 10/895,832, filed Jul. 22, 2004, Shindome, et al.
U.S. Appl. No. 09/909,831, filed Jul. 23, 2001, Tai, et al.
U.S. Appl. No. 09/909,832, filed Jul. 23, 2001, Tai, et al.

* cited by examiner

*Primary Examiner*—Marc A Patterson
(74) *Attorney, Agent, or Firm*—Oblon, Spivak, McClelland, Maier & Neustadt, L.L.P.

(57) ABSTRACT

The present invention relates to a coinjection stretch blow-molded container having a layer of thermoplastic polyester (A) that has specific properties and a layer of an ethylene-vinyl alcohol copolymer resin composition (B) that includes specific minor components and has specific properties, and the thickness ratio of the layer of thermoplastic polyester (A) to the layer of an ethylene-vinyl alcohol copolymer resin composition (B) (layer (A)/layer (B)) in the container body is in the specific range. The coinjection stretch blow molded container of the present invention has excellent gas barrier properties against, for example: oxygen and carbon dioxide; moisture-proofing properties; flavor-retention properties; flavor-barrier properties; and impact delamination resistance. In addition, the coinjection stretch blow molded container of the present invention has a good appearance and can be stably produced in long-run working lines.

19 Claims, 1 Drawing Sheet

Parison body side

Fig. 1:

Parison body side

Fig. 2:

Parison body side

COINJECTION STRETCH BLOW MOLDED CONTAINER

CROSS REFERENCE TO RELATED CASES

The present application claims priority to Japanese Patent Application No. JP 2002-37820, filed on Feb. 15, 2002, which is hereby incorporated by reference in its entirety.

BACKGROUND OF THE PRESENT INVENTION

1. Field of the Present Invention

The present invention relates to a container that has excellent gas barrier properties against, for example: oxygen and carbon dioxide; moisture-proofing properties; flavor-retention properties; flavor-barrier properties; and impact delamination resistance. In addition, the container of the present invention has a good appearance and can be stably produced in long-run working lines.

2. Discussion of the Background

Thermoplastic polyester (hereinafter abbreviated as PES) containers that have been obtained through stretch blow molding have gained popularity and are employed in several fields. The reason for their notoriety can be assigned to their various excellent properties, such as transparency, mechanical superiority and flavor barrier properties. In addition, the moldings of stretch blow molded PES containers are almost free from the risk of releasing residual monomers and harmful additives. Accordingly, these containers generally have excellent sanitation and safety records.

A particularly popular PES containers are multi-layer containers that employ a combination of PES and ethylene-vinyl alcohol copolymer (hereinafter abbreviated as EVOH), due to the good gas barrier properties. The use of these multi-layer containers are expected to be expanded to containers for drinks, foods, cosmetics, etc., since they can be produced in a simple apparatus and have good appearances. In addition these containers have the beneficial properties of both individual components: PES and EVOH. However, the aforementioned multi-layer containers are not free of problems. The critical problems associated with these ordinary multi-layer containers include: poor point-of-impact delamination resistance and poor transparency.

Among the proposals to address the problems associated with multi-layer containers, JP-A 11-348194 sets forth multi-layer containers comprising PES and partially-saponified EVOH that are produced through coinjection stretch blow molding. JP-A 11-348194 states that these multi-layer containers have good impact delamination resistance and transparency. The multi-layer containers are epoch-making ones in that they have satisfactory impact delamination resistance though not having adhesive resin between PES and EVOH. However, these multi-layer containers have some problem associated with gas barrier properties and thermal stability since they comprise partially-saponified EVOH. To solve this problem, other multi-layer containers have been proposed, which comprise an EVOH mixture of two different types of EVOH having different melting points (JP-A 2001-277341). These multi-layer containers have good impact delamination resistance and transparency and have improved gas barrier property and thermal stability. However, partially-saponified EVOH is still an indispensable component in the multi-layer containers, particularly in the production of the multi-layer containers in long-run working lines, and its thermal stability is not a negligible matter.

Accordingly, there remains a critical need for a multi-layer container that has excellent gas barrier properties, moisture-proofing properties, flavor-retention properties, flavor-barrier properties, and impact delamination resistance, which has a good appearance and can be stably produced in long-run working lines.

SUMMARY OF THE PRESENT INVENTION

Accordingly, it is an object of the present invention to provide a multi-layer container that has excellent gas barrier properties, moisture-proofing properties, flavor-retention properties, flavor-barrier properties, and impact delamination resistance, which has a good appearance and can be stably produced in long-run working lines.

The object is attained by a coinjection stretch blow molded container comprising: a layer of thermoplastic polyester (A), and a layer of an ethylene-vinyl alcohol copolymer resin composition (B);

wherein the layer of thermoplastic polyester (A) has an intrinsic viscosity of from 0.70 to 0.90 dl/g and a cyclic trimer content of at most 0.50% by weight of the overall weight of the layer of thermoplastic polyester (A);

wherein the layer of an ethylene-vinyl alcohol copolymer resin composition (B) comprises an ethylene-vinyl alcohol copolymer (b1) having an ethylene content of from 20 to 60 mol % and a degree of saponification of at least 90 mol %, acetic acid (b2), a phosphoric compound (b3) and a boron compound (b4), wherein:

the content ratio of acetic acid (b2) to the ethylene-vinyl alcohol copolymer (b1) is from 30 to 250 ppm, the content ratio of the phosphoric compound (b3) to the ethylene-vinyl alcohol copolymer (b1) is from 5 to 500 ppm in terms of the phosphoric radical, the content ratio of the boron compound (b4) to the ethylene-vinyl alcohol copolymer (b1) is from 20 to 2000 ppm in terms of the boron element, wherein the layer of an ethylene-vinyl alcohol copolymer resin composition (B) further comprises an alkali metal salt (b5), wherein the content ratio of the alkali metal salt (b5) to the ethylene-vinyl alcohol copolymer (b1) is at most 300 ppm in terms of the alkali metal and further comprises an alkaline earth metal salt (b6), and wherein the content ratio of the alkaline earth metal salt (b6) to the ethylene-vinyl alcohol copolymer (b1) is at most 10 ppm in terms of the alkaline earth metal, the melt index at 190° C., 2160 g loaded, of the layer of an ethylene-vinyl alcohol copolymer resin composition (B) is from 0.1 to 10 g/10 min; and wherein the thickness ratio of the layer of thermoplastic polyester (A) to the layer of an ethylene-vinyl alcohol copolymer resin composition (B) in the body of the container is from 90/10 to 99/1.

One preferred embodiment of the coinjection stretch blow molded container comprises only the layer of PES (A) and the layer of EVOH resin composition (B).

In another preferred embodiment, the cold-crystallization temperature of the layer of PES (A) is from 120 to 180° C.

In still another preferred embodiment, the density of the layer of PES (A) is from 1.35 to 1.39 g/cm$^3$.

In still another preferred embodiment, the content ratio of the alkaline earth metal salt (b6) to EVOH (b1) in the layer of EVOH resin composition (B) is at most 5 ppm in terms of the alkaline earth metal.

In still another preferred embodiment, the density of the layer of EVOH resin composition (B) is from 1.11 to 1.20 g/cm$^3$.

In still another preferred embodiment, the frequency of impact delamination of the coinjection stretch blow molded container is at most 20%.

In still another preferred embodiment, the haze of the body of the coinjection stretch blow molded container is at most 5%.

As another object of the present invention is a method of producing a coinjection stretch blow molded container, comprising coinjecting a thermoplastic polyester and a ethylene-vinyl alcohol copolymer resin composition to prepare a multi-layer precursor and subsequently stretch-blow-molding the precursor;

wherein the thermoplastic polyester has an intrinsic viscosity of from 0.70 to 0.95 dl/g and a cyclic trimer content of at most 0.40% by weight of the overall weight of the thermoplastic polyester;

wherein the ethylene-vinyl alcohol copolymer resin composition comprises an ethylene-vinyl alcohol copolymer (b1) having an ethylene content of from 20 to 60 mol % and a degree of saponification of at least 90 mol %, acetic acid (b2), a phosphoric compound (b3) and a boron compound (b4), wherein:

the content ratio of acetic acid (b2) to the ethylene-vinyl alcohol copolymer (b1) is from 30 to 250 ppm, the content ratio of the phosphoric compound (b3) to the ethylene-vinyl alcohol copolymer (b1) is from 5 to 500 ppm in terms of the phosphoric radical, the content ratio of the boron compound (b4) to the ethylene-vinyl alcohol copolymer (b1) is from 20 to 2000 ppm in terms of the boron element, and the ethylene-vinyl alcohol copolymer resin composition further comprises an alkali metal salt (b5), wherein the content ratio of the alkali metal salt (b5) to the ethylene-vinyl alcohol copolymer (b1) is at most 300 ppm in terms of the alkali metal and the ethylene-vinyl alcohol copolymer resin composition further comprises an alkaline earth metal salt (b6), wherein the content ratio of the alkaline earth metal salt (b6) to the ethylene-vinyl alcohol copolymer (b1) is at most 10 ppm in terms of the alkaline earth metal; and wherein the melt index at 190° C., 2160 g loaded, of the ethylene-vinyl alcohol copolymer resin composition is from 0.1 to 10 g/10 min.

In an embodiment of the inventive method above the thermoplastic polyester and the ethylene-vinyl alcohol copolymer resin composition are injected either alternately or simultaneously.

Also in an embodiment of the inventive method above the stretch blow molded container has a configuration of the thermoplastic polyester and the ethylene-vinyl alcohol copolymer resin composition with the following arrangement from the innermost layer to the outermost layer: thermoplastic polyester/ethylene-vinyl alcohol copolymer resin composition/thermoplastic polyester or thermoplastic polyester/ethylene-vinyl alcohol copolymer resin composition/thermoplastic polyester/ethylene-vinyl alcohol copolymer resin composition/thermoplastic polyester.

The above objects highlight certain aspects of the present invention. Additional objects, aspects and embodiments of the present invention are found in the following detailed description of the present invention.

BRIEF DESCRIPTION OF THE FIGURES

A more complete appreciation of the present invention and many of the attendant advantages thereof will be readily obtained as the same becomes better understood by reference to the following Figures in conjunction with the detailed description below.

DETAILED DESCRIPTION OF THE PRESENT INVENTION

Unless specifically defined, all technical and scientific terms used herein have the same meaning as commonly understood by a skilled artisan in polymers and materials chemistry.

All methods and materials similar or equivalent to those described herein can be used in the practice or testing of the present invention, with suitable methods and materials being described herein. All publications, patent applications, patents, and other references mentioned herein are incorporated by reference in their entirety. In case of conflict, the present specification, including definitions, will control. Further, the materials, methods, and examples are illustrative only and are not intended to be limiting, unless otherwise specified.

The coinjection stretch blow molded container of the present invention comprises at least one layer of a thermoplastic polyester (PES) (A) and at least one layer of a EVOH resin composition (B). If the container lacks either one of the layers, it does not exhibit the advantages of the present invention. The layer order is not specifically defined. Preferably, it is designed so that the layers of PES (A) are kept in contact with the contents inside of the container (i.e., the innermost layer) and a layer to be kept in contact with the air outside of the container (i.e., the outermost layer), and the layer of EVOH resin composition (B) is between the innermost layer and the outermost layer.

The thickness ratio of the layer of PES (A) to the layer of EVOH resin composition (B) (layer (A)/layer (B)) in the body of the container should be within a range of from 90/10 to 99/1. If the thickness ratio is less than 90/10, the necessary amount of the more expensive EVOH resin composition (B) increases too much and it the container becomes uneconomical. On the other hand, if the thickness ratio is larger than 99/1, the gas barrier property of the container is diminished.

The coinjection stretch blow molded container of the present invention may have an additional layer other than the layer of PES (A) and the layer of EVOH resin composition (B). For example, it may additionally have a recovery layer for recycling the starting material, an adhesive layer for improving the impact delamination resistance of the layer of PES (A) and the layer of EVOH resin composition (B), or any other resin layer for imparting desired additional properties.

However, accounting for the transparency and production costs, as well as ease of producibility in a simple apparatus, the coinjection stretch blow molded container of the present invention preferably comprises only the layer of PES (A) and the layer of EVOH resin composition (B).

Specific examples of the layer constitution include (inner layer) A/B/A (outer layer), (inner layer) A/B/A/B/A (outer layer), etc., but these are not limitative. Especially preferred is a two-resin three-layer constitution of (inner layer) A/B/A (outer layer) for imparting the desired impact delamination resistance.

In the coinjection stretch blow molded container of the present invention, the intrinsic viscosity of PES (A) should be from 0.70 to 0.90 dl/g, but is preferably from 0.75 to 0.85 dl/g.

If the intrinsic viscosity is less than 0.70 dl/g, the mechanical strength of the container is reduced. If the intrinsic viscosity is greater than 0.90 dl/g, the melt viscosity of the intended starting material is too high and the condition for stable production of the container becomes difficult, in addition to diminished productivity and increased production cost.

The cyclic trimer content of PES (A) should be at most 0.50% by weight of the overall weight of the PES (A), but is preferably at most 0.30% by weight. If the cyclic trimer content exceeds 0.50% by weight, the impact delamination resistance of the container is reduced and the cyclic trimer will bleed into the contents inside the container. Therefore, cyclic trimer contents over 0.50% by weight are undesirable from the viewpoint of sanitation.

The cold-crystallization temperature of PES (A) preferably is from 120 to 180° C., more preferably from 130 to 170° C. If the cold-crystallization temperature is lower than 120° C., the heat resistance of the container may be low. On the other hand, if the cold-crystallization temperature exceeds 180° C., the melting point of the intended starting material is too high and the condition for stable production of the container is compromised resulting in decreased productivity and increased cost.

The density of PES (A) is preferably from 1.35 to 1.39 g/cm$^3$, more preferably from 1.353 to 1.387 g/cm$^3$, even more preferably from 1.355 to 1.385 g/cm$^3$. If the density is less than 1.35 g/cm$^3$, the mechanical strength of the container will be low. In addition, the container may shrink greatly while hot filled or while heated for sterilization. On the other hand, if the density exceeds 1.39 g/cm$^3$, the frequency of impact delamination of the container may increase.

The type of PES (A) mentioned above may include polyesters that principally comprise dicarboxylic acid units such as aromatic dicarboxylic units and diol units such as aliphatic diol units. Polymers that principally comprise terephthalic acid units and ethylene glycol units, namely, polymers comprising an essential ingredient of ethylene terephthalate (polyethylene terephthalate—hereinafter abbreviated as PET) are preferred due to their mechanical properties, popularity, and cost. It is desirable that the total ratio (mol %) of terephthalic acid units and ethylene glycol units be at least 70 mol %, more preferably at least 90 mol % of the total moles of all constitutive units that constitute PES (A). If the ratio is smaller than 70 mol %, the crystallinity of PES (A) will decrease, and the mechanical strength of the container may be low and the thermal shrinkage thereof may increase.

PES (A) may optionally contain any other difunctional compound units other than terephthalic acid units and ethylene glycol units, which do not significantly detract from the mechanical properties, heat resistance and other desired properties of the container. The content ratio (mol %) of the additional units is preferably at most 30 mol %, more preferably at most 10 mol % of the total moles of all constitutive units that constitute PES (A). The difunctional compound units that may be further added include aliphatic compound units, alicyclic compound units, aromatic compound units, etc. These may be any of dicarboxylic acid units, diol units and hydroxycarboxylic acid units. The polymer may contain one or more types of the above-mentioned difunctional compound units.

Of the difunctional compound units which PES (A) may contain, the aliphatic compound units include aliphatic dicarboxylic acid units derived from malonic acid, succinic acid, adipic acid, azelaic acid, sebacic acid, etc.; aliphatic hydroxycarboxylic acid units derived from 10-hydroxyoctadecanoic acid, lactic acid, hydroxyacrylic acid, 2-hydroxy-2-methylpropionic acid, hydroxybutyric acid, etc.; aliphatic diol units derived from trimethylene glycol, tetramethylene glycol, hexamethylene glycol, neopentyl glycol, methylpentanediol, diethylene glycol. etc.

The alicyclic compound units include alicyclic dicarboxylic acid units derived from cyclohexanedicarboxylic acid, norbornenedioarboxylic acid, tricyclodecanedicarboxylic acid, etc.; alicyclic hydroxycarboxylic acid units derived from hydroxymethylcyclohexanecarboxylic acid, hydroxymethylnorbomenecarboxylic acid, hydroxymethyltricyclodecaneoarboxylic acid, etc.; alicyclic diol units derived from cyclohexanedimethanol, norbomenedimethanol, tricyclodecanedimethanol, etc. Of those, the cyclohexanedimethanol units and cyclohexanedicarboxylic acid units are preferred for improving the drop shock resistance and the transparency of the container. These units include isomers of 1,2-units, 1,3-units and 1,4-units. Of these, 1,4-units are more preferred as especially improving the drop shock resistance of the container.

The aromatic compound units include aromatic dicarboxylic acid units derived from isophthalic acid, phthalic acid, biphenyldicarboxylic acid, diphenylether-dicarboxylic acid, diphenylsulfone-dicarboxylic acid, diphenylketone-dicarboxylic acid, sodium sulfoisophthalate, 2,6-naphthalenedicarboxylic acid, 1,4-naphthalenedicarboxylic acid, 2,7-naphthalenedicarboxylic acid, etc.; aromatic hydroxyoarboxylic acid units derived from hydroxybenzoic acid, hydroxytoluic acid, hydroxynaphthoic acid, 3-(hydroxyphenyl)propionic acid, hydroxyphenylacetic acid, 3-hydroxy-3-phenylpropionic acid, etc.; aromatic diol units derived from 2,2-bis[4-(2-hydroxyethoxy)phenyl]propane, 2-{4-[2-(2-hydroxyethoxy)ethoxy]phenyl}-2-[4-(2-hydroxyethoxy)phenyl]propane, 2,2-bis{4-[2-(2-hydroxyethoxy)ethoxy]phenyl}propane, bis[4-(2-hydroxyethoxy)phenyl]sulfone, {4-[2-(2-hydroxyethoxy)ethoxy]phenyl}-[4-(2-hydroxyethoxy)phenyl)sulfone, 1,1-bis[4-(2-hydroxyethoxy)phenyllcyclohexane. 1-{4-(2-(2-hydroxyethoxy)ethoxy]phenyl}-1-[4-(2-hydroxyethoxy)phenyl]cyclohexane, 1,1-bis{4-[2-(2-hydxoxyethoxy)ethoxy]phenyl}cyclohexane, 2,2-bis[4-(2-hydroxyethoxy)-2,3,5,6-tetrabromophenyl]propane, 1,4-bis(2-hydroxyethoxy)benzene, 1-(2-hydroxyethoxy)-4-[2-(2-hydroxyethoxy)ethoxy]benzene, 1,4-bis[2-(2-hydroxyethoxy)ethoxy]benzene, etc.; aromatic diol units derived from bisphenol compounds, hydroquinone compounds, etc. Of those, 2,2-bis[4-(2-hydroxyethoxy)phenyl] propane units, bis[4-(2-hydroxyethoxy)phenyl]sulfone units and 1,4-bis(2-hydroxyethoxy)benzene units are preferred in view of the impact resistance of the container. From the viewpoint of the heat resistance of the container, preferred are neopentylglycol units and naphthalenedicarboxylic acid units; and from the viewpoint of their UV absorbability, preferred are naphthalenedicarboxylic acid units. For better UV absorption, it is desirable that naphthalenedicarboxylic acid units account for from 0.1 to 15 mol %, more preferably from 1.0 to 10 mol %, of all the dicarboxylic acid units of PES (A).

In addition to the above-mentioned intentional difunctional compound units therein, PES (A) often contains diethylene glycol units that are formed as side products during polymerization. The content ratio (mol %) is preferably at most 3 mol %, more preferably at most 2 mol % of the total moles of all constitutive units that constitute PES (A). If the content ratio of diethylene glycol units is over 3 mol %, the glass transition temperature of PES (A) will decrease and, as a result, the heat resistance of the container will decrease.

PES (A) may contain polyfunctional compound units. The content ratio (mol %) is preferably at most 0.5 mol % of the total moles of all constitutive units that constitute PES (A). The polyfunctional compound units are units derived from polyfunctional compounds having at least three carboxyl and/or hydroxyl groups in total. They include units derived from polycarboxylic acids that have at least three carboxyl groups only; and units derived from polyalcohol compounds that have at least three hydroxyl groups only. PES (A) may contain one type or more types of the above-mentioned polyfunctional compound units.

The polyfunctional compound units which PES (A) may contain include aliphatic polycarboxylic acid units derived from 1,3,5-cyclohexanetricarboxylic acid; aromatic polycarboxylic acid units derived from trimesic acid, trimellitic acid, 1,2,3-benzenetricarboxylic acid, pyromellitic acid, 1,4,5,8-naphthalenetetracarboxylic acid; aliphatic polyalcohol units derived from trimethylolpropane, pentaerythritol, glycerin, etc.; alicyclic polyalcohol units derived from 1,3,5-cyclohexanetriol, etc.; aromatic polyalcohol units derived from 1,3,5-trihydroxybenzene; aliphatic hydroxycarboxylic acids derived from tartaric acid, malic acid, etc.; aromatic hydroxycarboxylic acid units derived from 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, 2,4-dihydroxyphenylacetic acid, etc. Of those, preferred are the units derived from trimesic acid, trimellitic acid, pyromellitic acid, trimethylolpropane and pentaerythritol, due to the ease of polymer production and favorable production costs.

In the situation where PES (A) contains any of the above-mentioned polyfunctional compound units, it may also contain monofunctional compound units derived from monocarboxylic acids, mono alcohols and the like. The content ratio (mol %) is preferably at most 5 mol %, more preferably at most 1 mol % of the total moles of all constitutive units that constitute PES (A), in view of the easiness in the polymer production and of the production costs. PES (A) may contain one or more types of the above-mentioned monofunctional compound units.

The monofunctional compound units which PES (A) may contain include aliphatic monocarboxylic acid units derived from n-octanotc acid, n-nonanoic acid, myristic acid, pentadecanoic acid, stearic acid, oleic acid, linolic acid, linolenic acid, etc.: aromatic monocarboxylic acid units derived from benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthalene-acetic acid, 2-naphthalene-acetic acid, etc.; aliphatic monoalcohol units derived from pentadecyl alcohol, stearyl alcohol, polyethylene glycol monoalkyl ether, polypropylene glycol monoalkyl ether, polytetramethylene glycol monoalkyl ether, oleyl alcohol, etc.; alicyclic monoalcohol units derived from cyclododecanol, etc.; aromatic monoalcohol units derived from benzyl alcohol, 2,5-dimethylbenzyl alcohol, 2-phenethyl alcohol, phenol, 1-naphthol, 2-naphthol, etc. Of those, preferred are the units derived from stearic acid, benzoic acid, 2,4,6-trimethoxybenzoic acid, 2-naphthoic acid and stearyl alcohol, in view of ease of polymer production and favorable production costs.

The most characteristic feature of the coinjection stretch blow molded container of the present invention is that the EVOH resin composition (B) that comprises specific EVOH (b1) and a specific amount of specific minor components is used for the container.

Regarding the "long-run production" of the container that is one object of the present invention, for example, JP-A 11-43573 says that an EVOH resin composition that comprises EVOH and some specific minor components such as boron compound has good long-run workability in melt molding. In this, only the long-run workability of the composition in extrusion is referred to, but it is needless to say that the composition is required to have good long-run workability also in injection molding.

Having tried the EVOH resin composition for multi-layer container with PES, we, the present inventors have faced some problems in that it could not express the expected long-run workability, or, even though the long-run workability of the composition could be improved, the impact delamination resistance of the molded containers is still low. Accordingly, the composition still requires further investigation for any practical and/or commercial use. We, the present inventors have further studied and, as a result, have found that only a type of the above-mentioned EVOH resin composition that has a specific constitution as set forth herein has the advantage of improved long-run workability and can give coinjection stretch blow molded containers of good impact delamination resistance.

For the coinjection stretch blow molded container of the present invention, the ethylene content of EVOH (b1) in the EVOH resin composition (B) should be from 20 to 60 mol %. If the ethylene content is smaller than 20 mol %, the gas barrier property of the container under high humidity is poor. Preferably, the ethylene content is at least 25 mol %, more preferably at least 28 mol %. If the ethylene content exceeds 60 mol %, the gas barrier properties of the container are also poor. Preferably, the ethylene content is at most 50 mol %, more preferably at most 45 mol %.

The degree of saponification of the vinyl ester component of EVOH (b1) should be at least 90 mol %, but is preferably at least 96 mol %, more preferably at least 98.5 mol %. If the degree of saponification is less than 90 mol %, the gas barrier property of the container under high humidity is poor.

The ethylene content and the degree of saponification of EVOH may be obtained through nuclear magnetic resonance (NMR).

When EVOH (b1) is a mixture of at least two different types of EVOH that differ from each other in at least one of the ethylene content or the degree of saponification, the data of the ethylene content and the degree of saponification of every EVOH are averaged on the basis of the blend ratio of the constitutive EVOHs to obtain the ethylene content and the degree of saponification of the EVOH mixture.

The above-mentioned EVOH (b1) may contain a minor amount of any other comonomer component other than ethylene and vinyl alcohol, so long as the comonomer selected does not detract from the objects of the present invention. Examples of the comonomer are α-olefins such as propylene, 1-butene, isobutene, 4-methyl-1-pentene, 1-hexene, 1-octene; unsaturated carboxylic acids such as itaconic acid, methacrylic acid, acrylic acid, malefic acid, and their salts, partial or complete esters, nitriles, amides and anhydrides; vinylsilane compounds such as vinyltrimethoxysilane, vinyltriethoxysilane, vinyltri(β-methoxyethoxy)silane, γ-methacryloxypropyltrimethoxysilane; unsaturated sulfonic acids or their salts; alkylthiols; vinylpyrrolidones, etc.

For the coinjection stretch blow molded container of the present invention, the EVOH resin composition (B) indispensably contains acetic acid (b2), phosphoric compound (b3) and boron compound (b4), in addition to the above-mentioned EVOH (b1).

In the EVOH resin composition (B), the content ratio of acetic acid (b2) should be from 30 to 250 ppm to the above-mentioned EVOH (b1). If the content ratio of acetic acid (b2) is smaller than 30 ppm, the condition for stable production of the container is difficult to set, and the productivity is low and this is uneconomical. On the other hand, if the content ratio of acetic acid (b2) is over 250 ppm, acetic acid diffuses into the contents inside the container and detracts from the taste and the flavor of the contents.

In the EVOH resin composition (B), the content ratio of the phosphoric compound (b3) should be from 5 to 500 ppm in terms of the phosphoric radical, but is preferably from 6 to 450 ppm, more preferably from 7 to 400 ppm to the above-mentioned EVOH (b1). If the content ratio of the phosphoric compound (b3) is less than 5 ppm, the condition for stable production of the container is difficult to set, and the productivity is low and this is uneconomical. On the other hand, if the content ratio of the phosphoric compound (b3) is over 500 ppm, the phosphoric compound will readily move into the contents inside the container, and it is unfavorable from the viewpoint of sanitation.

The phosphoric compound (b3) maybe any of phosphoric acid, primary phosphoric salts, secondary phosphoric salts and tertiary phosphoric salts, but phosphoric acid, primary phosphoric salts and secondary phosphoric salts are preferred. When the phosphoric compound (b3) is a salt, its cation species is not specifically defined. For example, the cation species may include alkali metals such as sodium, potassium; and alkaline earth metals such as magnesium, calcium. Of those, preferred are alkali metals, but the others may also be employed. For the phosphoric compound (b3), preferred are sodium dihydrogenphosphate, potassium dihydrogenphosphate, disodium hydrogenphosphate and dipotassium hydrogenphosphate.

In the EVOH resin composition (B), the content ratio of the boron compound (b4) should be from 20 to 2000 ppm in terms of the boron element, but is preferably from 50 to 1000 ppm, more preferably from 100 to 500 ppm to the above-mentioned EVOH (b1). If the content ratio of the boron compound (b4) is less than 20 ppm, the condition for stable production of the container is difficult to set, and the productivity is low and this is uneconomical. On the other hand, if the content ratio of the boron compound (b4) is over 2000 ppm, the boron compound will readily bleed into the contents inside the container, and it is unfavorable from the viewpoint of sanitation. In addition, the commercial value of the container is low because of the bad appearance thereof.

The boron compound (b4) includes boric acids, boric esters, boric salts, boron hydrides, etc. As specific examples, the following may be mentioned: the boric acids include orthoboric acid (this will be hereinafter abbreviated as boric acid), metaboric acid, tetraboric acid, etc.; the boric esters include triethylborate, trimethyl borate, etc.; the boric salts include alkali metal salts and alkaline earth metal salts of various boric acids such as those mentioned above, as well as borax, etc.; and the boron hydrides include sodium borohydride, etc. Of these compounds, orthoboric acid and sodium borohydride are preferred.

In addition to the above-mentioned components, the layer of the EVOH resin composition (B) may also contain an alkali metal salt and/or an alkali earth metal salt.

The content ratio of the alkali metal salt (b5) to the above-mentioned EVOH (b1) in the EVOH resin composition (B) must be at most 300 ppm in terms of the alkali metal, but is preferably from 10 to 280 ppm, more preferably from 20 to 250 ppm. If the content ratio of the alkali metal salt (b5) exceeds 300 ppm, the alkali metal salt will readily diffuse into the contents inside the container and, therefore, it is unfavorable with respect to sanitation. The alkali metal to form the alkali metal salt (b5) includes lithium, sodium, potassium, etc. The alkali metal salt (b5) includes acetates such as lithium acetate, sodium acetate, potassium acetate; propionates such as lithium propionate, sodium propionate, potassium propionate, etc.

The content ratio of the alkaline earth metal salt (b6) to the above-mentioned EVOH (b1) in the EVOH resin composition (B) must be at most 10 ppm in terms of the alkaline earth metal, but is preferably at most 5 ppm. If the content ratio of the alkaline earth metal salt (b6) exceeds 10 ppm, the alkaline earth metal salt will readily diffuse into the contents of the container and, therefore, it is unfavorable with respect to sanitation. In addition, the condition for stable production of the container becomes difficult to maintain while the productivity decreases, which is uneconomical. The alkaline earth metal includes calcium, magnesium, beryllium, barium, etc., and the alkaline earth metal salt (b6) includes carbonates, acetates and the like of these metals.

The melt index (at 190° C. with 2160 g loaded, based on JIS K7210) of the EVOH resin composition (B) should be from 0.1 to 10 g/10 min. If the melt index is less than 0.1 g/10 min, the melt viscosity of the starting material will be too high, and it becomes difficult to maintain stable production of the container, as such the productivity decreases making the production process uneconomical. Preferably, the melt index is at least 0.5 g/10 min. On the other hand, if the melt index exceeds 10 g/10 min, the mechanical properties of the container diminish, and the container will crack readily on drop-impact and loses its gas barrier properties. Preferably, the melt index is at most 8 g/10 min, more preferably at most 6 g/10 min.

Preferably, the density of the EVOH resin composition (B) is from 1.11 to 1.20 g/cm$^3$. If the density is less than 1.11 g/cm$^3$, the gas barrier properties of the container may be poor. More preferably, the density is at least 1.12 g/cm$^3$, even more preferably at least 1.13 g/cm$^3$. On the other hand, if the density exceeds 1.20 g/cm$^3$, the frequency of impact delamination of the container may increase. More preferably, the density is at most 1.19 g/cm$^3$, even more preferably at most 1.18 g/cm$^3$.

Preferably, the melting point of the EVOH resin composition (B) is from 140 to 190° C. If the melting point is less than 140° C., the gas barrier properties of the container may be poor. More preferably, the melting point is not less than 145° C.; even more preferably not less than 150° C. On the other hand, if the melting point exceeds 190° C., the frequency of impact delamination of the container may increase. More preferably, the melting point is not higher than 185° C.

If desired, the EVOH resin composition (B) may also contain a thermal stabilizer, an UV absorbent, an antioxidant, a colorant, a filler, and other resins, such as a polyamide, a polyolefin, etc., so long as the additive does not detract from the objects of the present invention.

Next described is a method for producing the coinjection stretch blow molded container of the present invention.

PES necessary for producing the coinjection stretch blow molded container of the present invention may be prepared through ordinary known polycondensation of starting materials of a dicarboxylic acid or its ester-forming derivative, a diol, and optionally any of the above-mentioned difunctional compounds, polyfunctional compounds and monofinctional compounds. For example, the starting materials are mixed and subjected to esterifzcation or transesterification and then to melt polycondensation and optionally further to solid-state condensation to give PES.

The dicarboxylic acid and the diol in this case are preferably terephthalic acid and ethylene glycol as so mentioned hereinabove. For the other optional difunctional compounds, referred to are the same as those mentioned hereinabove. Of the other difunctional compounds than terephthalic acid and ethylene glycol, in view of the relative ease in the polymer production, preferred are neopentyl glycol, cyclohexanedimethanol, cyclohexanedicarboxylic acid, isophthalic acid, phthalic acid, naphthalenedicarboxylic acid (especially 2,6-naphthalenedicarboxylic acid), 4,4'-biphenyldicarboxylic acid, 2,2-bis[4-(2-hydroxyethoxy)phenyl]propane, bis[4-(2-hydroxyethoxy)phenyl] sulfone and 1,4-bis (2-hydroxyethoxy)benzene. Of these, more preferred are isophthalic acid, phthalic acid, naphthalenedicarboxylic acid (especially 2,6-naphthalenedicarboxylic acid) and 4,4'-biphenyldicarboxylic acid, based on favorable production costs.

On the other hand, considering the property of PES obtained, isophthalic acid is preferred in view of the moldability and the crystallization retardancy of the polymer during molding; and 2,2-bis[4-(2-hydroxyethoxy)phenyl]propane, bis[4-(2-hydroxyethoxy)phenyl]sulfone and 1,4-bis (2-hydroxyethoxy)benzene are preferred based on the thermal stability and the melt stability of the polymer.

When ethylene glycol is used as the starting diol, diethylene glycol that is formed as a side product during polymerization is introduced into the backbone chain of the polymer, as so mentioned hereinabove, and the resulting PES may be discolored or its heat resistance and mechanical strength may compromised. To solve this problem, it is desirable to use from 0.001 to 0.5% by weight, based on the weight of the starting dicarboxylic acid used, of a diethylene glycol side-production inhibitor during esterification, transesterification and melt polycondensation. The side-production inhibitor includes, for example, tetraalkylammonium hydroxides such as tetraethylarnmonium hydroxide, etc.; organic amines such as triethanolamine, triethylamine, etc.

When a polyfunctional compound is used as the starting material in producing PES, it is desirable to use a monofunctional compound along with it, as so mentioned hereinabove. The monofunctional compound terminates the backbone chain or the branches of PES being produced, and prevents PES from being overcrosslinked or gelled. The amount of the monofunctional compound that may be used is not specifically defined, but is preferably within a range that does not lower the polymerization rate of solid-state polymerization that will be mentioned below.

Thus produced, PES is used in molding as in the manner mentioned below. In this stage, preferably, the intrinsic viscosity of PES is somewhat higher than that of PES (A), taking the matter into consideration that it may lower some degree during molding. Concretely, it is preferably from 0.70 to 0.95 dl/g. If the intrinsic viscosity of PES exceeds 0.95 dl/g, the melt viscosity of PES will be too high and the quantity of heat that is generated in the bulb during injection molding will increase, whereby the amount of the side product (cyclic trimer) may increase resulting in soiling of the mold and others. In addition, PES will be unevenly stretched during stretch blow molding, and it will greatly detract from the appearances of the molded containers.

Preferably, the cyclic trimer content of PES is less than that of PES (A), because the cyclic trimer content may increase to some degree during molding. It is preferable that the cyclic trimer content be at most 0.40% by weight of the overall weight of PES. If the cyclic trimer content of PES exceeds 0.40% by weight, the mold and others may be much soiled.

Also preferably, the terminal carboxyl group concentration in PES is at most 0.00004 equivalents per gram of PES, or that is at most 40 μeq/g, more preferably at most 30 μeq/g. If the terminal carboxyl group concentration in PES exceeds 40 μeq/g, it will diminish the thermal stability of PES during melting resulting in poor appearances of the containers, for example, the containers may be discolored, and their mechanical strength may diminish.

EVOH that is in the EVOH resin composition necessary for producing the coinjection stretch blow molded container of the present invention is obtained by saponifying a copolymer of ethylene and vinyl ester with an alkali catalyst or the like. The vinyl ester is typically vinyl acetate; however, also usable are other vinyl esters of fatty acids (vinyl propionate, vinyl pivalate, etc.). In this stage, EVOH having a desired melting point can be obtained by controlling the ethylene content and the degree of saponification of EVOH being produced.

Any other monomer may also be copolymerized with ethylene and vinyl ester to obtain the copolymer, so long as the monomer selected does not detract from the object of the present invention as so mentioned hereinabove. Above all, EVOH that contains from 0.0002 to 0.2 mol % of a comonomer, vinylsilane compound, is good as its melt viscosity balances well with that of PES in coinjection molding, which will be mentioned below. Therefore the good melt viscosity balance enables production of homogeneous moldings. For the vinylsilane compound, preferred are vinyl tximethoxysilane and vinyltriethoxysilane. Preferably, the vinylsilane compound content of EVOH is from 0.001 to 0.15 mol %, more preferably from 0.005 to 0.1 mol %.

Methods of preparing the EVOH resin composition by mixing EVOH with acetic acid (b2), a phosphoric compound (b3), and a boron compound (b4) are not specifically defined. For example, they include a method of melt-kneading EVOH with a predetermined amount of the additive components in an extruder or the like; a method of adding a predetermined amount of these components to EVOH solution either directly as they are or in the form of their solutions; and a method of dipping EVOH pellets in a solution of a predetermined concentration of these additives.

Acetic acid (b2) and the phosphoric compound (b3) contribute toward improving the thermal stability and the melt moldability of EVOH. The boron compound (b4) increases the melt viscosity of EVOH and contributes toward retarding the torque fluctuation in melting the polymer. Accordingly, it is a matter of great importance to add a predetermined amount of these components to EVOH to maintain the long-run workability of the polymer composition in producing the coinjection stretch blow molded container of the present invention.

Alkali metal salt (b5) and alkaline earth metal salt (b6) promote pyrolysis of EVOH. Therefore, if too much is present in the polymer, they will give offensive components of acetaldehyde, crotonaldehyde, aldol and the like during molding. Accordingly, it is also a matter of great importance to control the content of these components below a predetermined level, for example, by washing EVOH, to maintain the long-run workability of the polymer composition in producing the coinjection stretch blow molded container of the present invention.

Preferably, the melt index (190° C. with 2160 g loaded, based on JIS K7210) of the thus-obtained EVOH resin composition is from 0.1 to 10 g/10 min. If the melt index is lower than 0.1 g/10 min, the molding apparatus that will be mentioned below shall receive too much load while molding the resin composition, and could not withstand high-speed continuous operation. In addition, the containers produced may have gels, fish eyes and streaks on their surfaces, and their appearances will be extremely bad. On the other hand, if the melt index exceeds 10 g/10 min, the EVOH thickness in the containers produced may be uneven, and the thick part may whiten and the gas barrier properties of the thin part will be poor. In addition, in multi-molding, the amount of EVOH to be fed into each mold could not be stabilized and homogeneous molding will be difficult to attain.

From the starting material as above, a multi-layer container precursor (closed-end parison) is first prepared. In general, a molding machine having two injection cylinders is used for producing the closed-end parison. Specifically, the single mold of the machine is first clamped, then the melts of the above-mentioned PES and EVOH resin composition are injected into the mold cavity alternately through the respective cylinders at different timings or simultaneously thereinto through a concentric nozzle, or these operations are continued. To attain the injection any ordinary method of producing closed-end parisons having a completely closed inner layer of PES is employable. For example, (1) PES for the inner and outer layers is first injected into the mold cavity and then the EVOH resin composition to be the interlayer is injected therebetween to form a two-resin three-layer closed-end parison of A/B/A; or (2) PES for the inner and outer layers is first injected into the mold cavity, then an EVOH resin composition is injected therebetween, and simultaneously with it or after that, PES to be the core layer is again injected into it to form a two-resin five-layer closed-end parison of A/B/A/B/A.

Regarding the injection molding conditions for the closed-end parison, the injection temperature of PES preferably is from 250 to 330° C., more preferably from 270 to 320° C., even more preferably from 280 to 310° C. If the injection temperature of PES is less than 250° C., non-melted solids will remain in the resulting closed-end parison and they will form fish eyes, therefore causing some problems in that the appearance of the container obtained and a reduction in the mechanical strength. In an extreme case, in addition, the screw torque may increase and the molding machine will fail to run. On the other hand, if the injection temperature is higher than 330° C., PES will too decompose readily; therefore causing a reduction in the mechanical strength of the container and the decomposed gas such as acetaldehyde adversely affects the contents inside the container. In addition, the cyclic trimer that will be produced at the same time may soil molds and the appearance of the container obtained will diminish as the soiling increases.

Also preferably, the injection temperature of the EVOH resin composition falls from 170 to 250° C., more preferably between 180 and 240° C., even more preferably between 190 and 230° C. If the injection temperature of the EVOH resin composition is less than 170° C., non-melted solids will remain in the resulting closed-end parison and they will form fish eyes to diminish the appearance of the container obtained. In an extreme case, in addition, the screw torque may increase and the molding machine will fail to run. On the other hand, if the injection temperature thereof is higher than 250° C., the EVOH resin composition will decompose or gel, therefore causing some problems in the appearance and a reduction in gas barrier properties of the container. In an extreme case, the gel formed will also make injection molding impossible.

Also preferably, the temperature of the hot runner block through which PES and the EVOH resin composition run into the mold cavity is from 220 to 300° C., more preferably from 240 to 280° C., even more preferably between 250 and 270° C. If the temperature of the hot runner block is less than 220° C., PES will solidify when passing through it leading to molding difficulties. On the other hand, if the temperature of the hot runner block exceeds 300° C., the EVOH resin composition will decompose or gel, therefore causing some problems in the appearance and a reduction in gas barrier properties of the container. In an extreme case, the gel formed will also make injection molding impossible.

In injection molding, for example, the injection rate and the injection amount of PES and also the injection rate and the injection amount of the EVOH resin composition may be suitably controlled whereby the thickness ratio of the layer of PES (A) to the layer of EVOH resin composition (B) in the body of the container to be obtained is within a desired range.

Preferably, the mold temperature falls between 0 and 70° C., more preferably between 5 and 50° C., even more preferably between 10 and 30° C. If the mold temperature is less than 0° C., the appearance of the closed-end parison formed will be bad due to dew condensation inside the mold. On the other hand, if the mold temperature exceeds 70° C., PES and the EVOH resin composition in the closed-end parison formed will crystallize too much leading to reduced transparency of the container obtained, the parison become difficult to uniformly stretch in the subsequent stretch blow molding step, the shapability of the parison is diminished, and the impact delamination resistance of the container is reduced.

Figure 1:
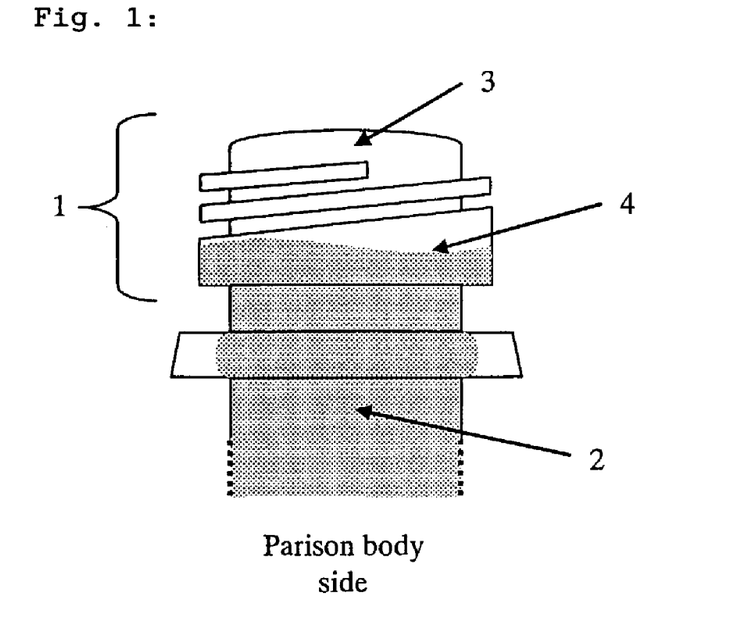
FIG. 1 is an outline view showing a part of a closed-end parison having a good leading edge.
Figure 2:
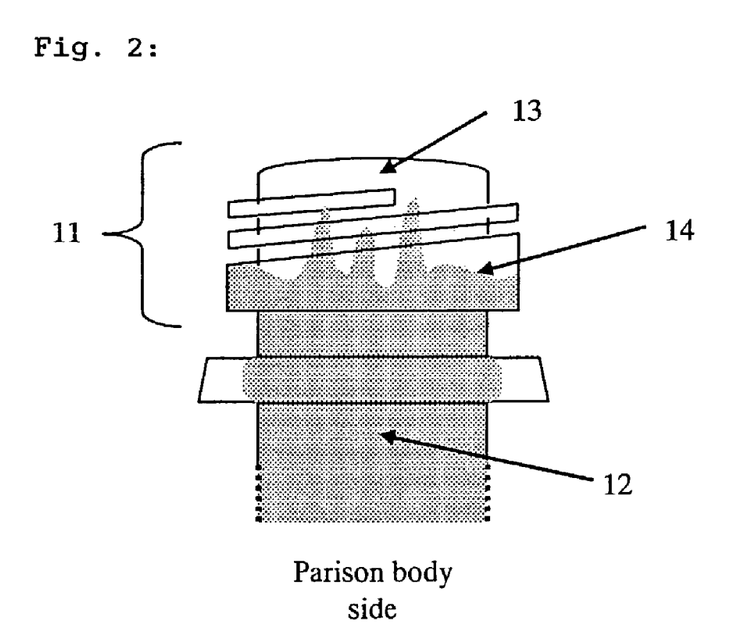
FIG. 2 is an outline view showing a part of a closed-end parison having a bad leading edge as in Comparative Example 7.

In the manner described above, a precursor of the coinjection stretch blow molded container closed-end parison is obtained. FIG. 1 and FIG. 2 both show an outline of a part of such a closed-end parison. The most significant part of the closed-end parison is a multi-layer part (2 and 12 in the drawings) that comprises a layer of PES (A) and a layer of an EVOH resin composition (B), but the parison has a single-layer part of PES (A) alone (3 and 13 in the drawings) at the tip of the mouth of the container (1 and 11 in the drawings). Regarding the appearance of the closed-end parison, the presence or absence of discoloration and formation of gels, streaks and the like, and also the condition of the leading edge (4 and 14 in the drawings) of the layer of the EVOH resin composition (B) at the mouth of the container are matters of importance. The preferred condition of the leading edge is described with reference to the drawings in which the bottom of the closed-end parison faces below. When the line of the leading edge is almost horizontal as in FIG. 1, its condition is good. When the closed-end parison in that good condition is subjected to stretch blow molding it gives a container having a good appearance and a good gas barrier property at low costs. However, if the line of the leading edge is waved as in FIG. 2, it may cause some problems in that the appearance and the gas barrier property of the container obtained are not good.

It is desirable that the thickness of the body wall of the closed-end parison is from 2 to 5 mm in terms of the overall thickness of all layers and the EVOH resin composition layer is from 20 to 500 μm in total thickness. If the EVOH resin composition layer is thicker than necessary, the parison could stretch poorly in the subsequent stretch blow-molding step.

Thus obtained, the closed-end parison is subjected to stretch blow molding to produce the coinjection stretch blow molded container of the present invention. Directly while hot, or after re-heated with a heating device such as block heater, IR heater or the like, preferably up to 75 to 150° C., the closed-end parison is transferred into a stretch blowing zone in which it is stretched one to five-fold in the longitudinal direction and then stretch-blow-molded one to four-fold with compression air or the like applied thereto. While heated, the temperature of the closed-end parison preferably is from 85 to 140° C., more preferably from 90 to 130° C. even more preferably from 95 to 120° C. If the temperature of the closed-end parison being heated exceeds 150° C., PES therein will excessively crystallize and the transparency and the impact delamination resistance of the container obtained may be reduced. On the other hand, if the temperature of the closed-end parison being heated is less than 75° C., PES will craze and the container obtained will be pearly and would not be transparent.

The overall thickness of the body wall of the coinjection stretch blow molded container of the present invention generally is from 100 μm to 3 mm, and may vary within the range depending on the use of the container.

The coinjection stretch blow molded container of the present invention obtained in the manner as above has extremely good impact delamination resistance. In particular, when the container filled with water is spontaneously dropped only once from a height of 50 cm at which the container body is kept horizontal, toward a triangular stand having an angle of 90° and a length of 20 cm in such a manner that the center of the container body may hit the angular edge of the stand, it is desirable that the frequency of delamination of the container is at most 20%.

Preferably, the haze of the body of the coinjection stretch blow molded container of the present invention is at most 5%, more preferably at most 4%, even more preferably at most 3%. If the haze is over 5%, the commercial value of the container is extremely low.

The coinjection stretch blow molded container of the present invention is suitable for storing various contents for a long period of time, and is useful for storing therein various drinks such as carbonated drinks, beer, wine, etc.; foods, cosmetics, etc.

Having generally described this invention, a further understanding can be obtained by reference to certain specific examples, which are provided herein for purposes of illustration only, and are not intended to be limiting unless otherwise specified.

EXAMPLES

In the Examples presented hereinbelow, samples were analyzed and evaluated according to the following methods:

Analysis of PES (1) Content of Structural Units:

A sample is subjected to $^1$H-NMR (using JEOL's JNM-GX-500 Model) with trifluoroacetic acid deutexide as a solvent, and the content of the structural units constituting the sample is obtained from the resulting spectrum.

(2) Terminal Carboxyl Group Concentration:

0.2 g of a sample is dissolved in 10 ml of benzyl alcohol heated at 215° C., and 10 ml of chloroform is added to the resulting solution. Using sodium hydroxide dissolved in benzyl alcohol, the solution is titered to determine the terminal carboxyl group concentration of the sample.

(3) Cyclic Trimer Content:

100 mg of a sample is dissolved in 2 ml of chloroform/1,1,1,3,3,3-hexafluoro-2-propanol (1/1 by volume) and then diluted with 8 ml of chloroform added thereto. Further, acetonitrile is added to make 100 ml, and the polymer component is deposited. This resulting suspension is filtered to remove the polymer component. The resulting filtrate is analyzed by high-performance liquid chromatography (column: Chemco's ODS-II, detectors: UV and visible detector and refractivity detector) with aqueous 75 vol. % acetonitrile as an eluent, and the cyclic trimer content (% by weight) of the sample is obtained from the calibration curve thereof.

(4) Intrinsic Viscosity:

Measured at 30° C., using a Ubbellohde viscometer (Hayashi Manufacturer's HPK-3 Model) with a mixed solvent of phenol/tetrachloroethane (1/1 by weight).

(5) Cold-Crystallization Temperature:

As a device, used is a differential scanning calorimeter (DSC), Seiko Electronics' RDC220/SSC5200H Model; and indium and lead are used as temperature calibration samples. A sample is kept molten at 300° C. for 5 minutes, then rapidly cooled in liquid nitrogen for a few seconds, and then kept at room temperature. Next, the sample is heated at a rate of 20° C./min, and its cold-crystallization temperature is obtained from the resulting DSC chart.

(6) Density:

Using a density gradient tube filled with n-hexane/carbon tetrachloride mixture and kept at 25° C., the density of a filmy sample of 0.5 cm×0.5 cm is measured.

(7) Glass Transition Temperature and Melting Point:

Measured according to JIS K7121, using the same device and the same temperature calibration samples as above for determination of cold-crystallization temperature. A sample is kept at 280° C. for 5 minutes, then cooled to 30° C. at a rate of 100° C./min, and then kept at that temperature for 5 minutes. Next, the sample is heated at a rate of 10° C./min, and the glass transition temperature and the melting point of the sample are obtained from the resulting DSC chart. As in JIS K7121, the glass transition temperature is the midway glass transition temperature (Tmg) of the sample, and the melting point is the peak melting temperature (Tpm) thereof.

Analysis of EVOH Resin Composition (8) Ethylene Content and Degree of Saponification of EVOH (b1):

A sample is subjected to $^1$H-NMR (using JEOL's JNM-GX-500 Model) with dimethylsulfoxide deuteride as a solvent, and the ethylene content and the degree of saponification of the sample are obtained from the resulting spectrum.

(9) Content Ratio of Acetic Acid (b2):

20 g of a sample is put into 100 ml of ion-exchanged water, and extracted under heat at 95° C. for 6 hours. The resulting extract is titered for neutralization with aqueous 0.02 N sodium hydroxide, using phenolphthalein as an indicator, and the content ratio of acetic acid (b2) to EVOH (b1) in the sample is determined.

(10) Content Ratio of Phosphoric Compound (b3):

10 g of a sample is put into 50 ml of aqueous 0.01 N hydrochloric acid, and stirred at 95° C. for 6 hours. After stirring, the resulting aqueous solution is quantitatively analyzed through ion chromatography to obtain the amount of the phosphate ion therein. A column of Yokogawa Electric's CIS-A23 is used; and the eluent is an aqueous solution that contains 2.5 mM sodium carbonate and 1.0 mM sodium hydrogencarbonate. The determination is based on the calibration curve formed with aqueous phosphoric acid. From the amount of the phosphate ion thus determined, the content ratio of the phosphoric compound (b3) to EVOH (b1) in the sample is obtained in terms of the phosphoric radical therein.

(11) Content Ratio of Boron Compound (b4):

50 mg of a sample is completely fired according to an oxygen flask combustion method, and the fired ash is dissolved in 10 ml of aqueous 1 N nitric acid. The resulting solution is quantitatively analyzed through high-frequency plasma emission spectrometry (with Jarrell-Ash's ICP emission spectrometer, IRIS AP), and the content ratio of the boron compound (b4) to EVOH (b1) in the sample is obtained in terms of the boron element therein.

(12) Content Ratios of Sodium Salt (b5) and Magnesium Salt (b6):

10 g of a sample is put into 50 ml of aqueous 0.01 N hydrochloric acid, and stirred at 95° C. for 6 hours. After stirring the mixture, the resulting aqueous solution is quantitatively analyzed through ion chromatography to obtain the amount of the sodium ion and the magnesium ion therein. A column of Yokogawa Electric's ICS-C25 is used; and the eluent is an aqueous solution that contains 5.0 mM of tartaric acid and 1.0 mM of 2,6-pyridinedicarboxylic acid. The determination is based on the calibration curves formed with aqueous solutions of the respective metal chlorides. From the amount of the respective metal ions thus determined, the content ratios of the sodium salt (b5) and the magnesium salt (b6) to EVOH (b1) in the sample are obtained in terms of the individual metals therein.

(13) Melt Index:

Measured with a melt indexer L244 (by Takara Industry). A sample is filled in a cylinder having an inner diameter of 9.55 mm and a length of 162 mm, and melted therein at 190° C. Then, the cylinder is uniformly loaded with a plunger having a weight of 2160 g and a diameter of 9.48 mm, and the flow-out rate (g/10 min) of the EVOH resin composition (B) that is extruded out through the 2.1 mmφ orifice formed at the center of the cylinder is measured. This flow-out rate corresponds to the melt index of the sample.

(14) Density:

Using a density gradient tube filled with n-hexane/carbon tetrachloride mixture and kept at 25° C., the density of a filmy sample of 0.5 cm×0.5 cm is measured.

(15) Melting Point:

Measured according to JIS K7121, using the same device and the same temperature calibration samples as those used above for the determination of the melting point of PES. A sample is kept at 240° C. for 5 minutes, then cooled to 30° C. at a rate of 100° C./min, and then kept at that temperature for 5 minutes. Next, the sample is heated at a rate of 10° C./min, and the melting point of the sample is obtained from the resulting DSC chart. As in JIS K7121, the melting point is the peak melting temperature (Tpm) of the sample.

Container Evaluation (16) Frequency of Impact Delamination:

A sample container is filled with water and sealed up with closure occurring under normal pressure. The container is then spontaneously dropped, only once, from a height of 50 cm at which the container body is maintained in a horizontal position, toward a triangular stand having an angle of 90° and a length of 20 cm in such a manner that the center of the container body may hit the angular edge of the stand. 100 samples of the same type of container are tested, and the number of the delaminated samples (Nd) is counted. From this sample pool, the delamination frequency (Rd) of the samples is obtained according to the following equation:

$Rd(\%)=(Nd/100) \times 100.$ (17) Haze Value (Cloudiness Value):

The body of a container sample is divided into four equal portions around the circumference at its center, and the internal haze value of each of those four portions is measured with a Poic integrating-sphere light transmittance/complete light reflectance meter (HR-100 Model from Murakami Color Technology Laboratories) according to ASTM D1003-61. The data are averaged, and the resulting mean value indicates the haze value (cloudiness value) of the container.

(18) Oxygen Transmission Rate:

Container samples are conditioned at 20° C. and 65% RH for their outside and at 20°C. and 100% RH for their inside. The oxygen transmission rate through each container (ml/container·day·atm) is measured with an oxygen transmission rate measuring device, OX-TRAN-10/50A (from Modern Control).

PES Polymer Preparation

Production of Polyethylene Terephthalate Resin (PET1):

100.000 parts by weight of terephthalic acid and 44.830 parts by weight of ethylene glycol were mixed into slurry. To this slurry 0.010 parts by weight of germanium dioxide, 0.010 parts by weight of phosphorous acid, and 0.010 parts by weight of tetraethylammonium hydroxide were added. Then, the slurry mixture was heated at 250° C. under an absolute pressure of 2.5 kg/cm² to esterify the monomers into an oligomer having a degree of esterification of 95%. Next, the resulting oligomer was melt-polycondensed at 270° C. under a reduced pressure of 1 mmHg to give a polyethylene terephthalate (PET) prepolymer having an intrinsic viscosity of 0.50 dl/g. The PET prepolymer was extruded out through a nozzle into strands, which were then cooled in water and cut into columnar pellets having a diameter of about 2.5 mm and a length of about 2.5 mm. These were pre-dried at 160° C. for 5 hours for crystallization.

In the PET prepolymer, the content of terephthalic acid units, that of ethylene glycol units and that of side-produced diethylene glycol units were 50.0 mol %, 48.9 mol % and 1.1 mol %, respectively. The terminal carboxyl group concentration therein was 38 µeq/g; and the melting point of the prepolymer was 253° C.

Using a rolling vacuum solid-state polymerization device, the PET prepolymer was polymerized in a solid state at 220° C. for 10 hours under a reduced pressure of 0.1 mmHg to obtain a PET resin (PET1).

In PET1, the content of terephthalic acid units, that of ethylene glycol units and that of diethylene glycol units were 50.0 mol %, 48.9 mol % and 1.1 mol %, respectively. The terminal carboxyl group concentration therein was 22 µeq/g; the cyclic trimer content of the polymer was 0.32% by weight; the intrinsic viscosity thereof was 0.83 dl/g; the cold-crystallization temperature was 155° C.; the glass transition temperature was 80° C.; the melting point was 252° C.; and the density was 1.369 g/cm³.

Production of Polyethylene Terephthalate Resin (PET2)

A PET resin (PET2) was obtained in the same manner described above except that the time for melt polycondensation was varied. In PET2, the content of terephthalic acid units, that of ethylene glycol units and that of diethylene glycol units were 50.0 mol %, 48.9 mol % and 1.1 mol %, respectively. The terminal carboxyl group concentration therein was 23 µeq/g; the cyclic trimer content of the polymer was 0.90% by weight; the intrinsic viscosity was 0.69 dl/g; the cold-crystallization temperature was 159° C.; the glass transition temperature was 80° C.; the melting point was 252° C.; and the density was 1.368 g/cm³.

Production of Polyethylene Terephthalate Resin (PET3)

A PET resin (PET3) was obtained in the same manner described above except that the time for solid-state polymerization was varied to 30 hours. In PET3, the content of terephthalic acid units, that of ethyl ene glycol units and that of di ethylene glycol units were 50.0 mol %, 48.9 mol % and 1.1 mol %, respectively. The terminal carboxyl group concentration therein was 18 μeq/g; the cyclic trimer content of the polymer was 0.15% by weight; the intrinsic viscosity was 0.96 dl/g; the cold-crystallization temperature was 155° C.; the glass transition temperature was 80° C.; the melting point was 252° C.; and the density was 1.369 g/cm$^3$.

The composition of PET1, PET2, and PET3 are summarized in Table 1 and the physical properties are in Table 2, below.

TABLE 1

|  | TA unit (mol %) | EG unit (mol %) | DEG unit (mol %) | —COOH (μeq/g) | CT (wt %) |
|---|---|---|---|---|---|
| PET1 | 50.0 | 48.9 | 1.1 | 22 | 0.32 |
| PET2 | 50.0 | 48.9 | 1.1 | 23 | 0.90 |
| PET3 | 50.0 | 48.9 | 1.1 | 18 | 0.15 |

TA: Terephthalic acid
EG: Ethylene glycol
DEG: Diethylene glycol
—COOH: Terminal COOH
CT: Cyclic trimer

TABLE 2

|  | IV (dl/g) | Tc (° C.) | Tmg (° C.) | Tpm (° C.) | Density (g/cm$^3$) |
|---|---|---|---|---|---|
| PET1 | 0.83 | 155 | 80 | 252 | 1.369 |
| PET2 | 0.69 | 159 | 80 | 252 | 1.368 |
| PET3 | 0.96 | 155 | 80 | 252 | 1.369 |

IV: Intrinsic viscosity
Tc: Cold-crystallization temperature

EVOH resin compositions having the constitution and physical properties shown in Table 3 and Table 4 were produced and used in the Examples of the present invention. The method for producing EVOH12 (EVOH blend) follows:

Production of EVOH 12

80 parts by weight of EVOH having an ethylene content of 32 mol % and a degree of saponification of 99.5 mol % and 20 parts by weight of EVCH having an ethylene content of 44 mol % and a degree of saponification of 96.5 mol % were dry-blended. Next, using a 30 mmφ twin-screw extruder (Japan Steel Works's TEX-30SS-30CRW-2V), the resulting blend was extruded out and pelletized. The extruder temperature was 210° C.; the resin temperature was 220° C.; the number of screw revolutions was 300 rpm; and the resin extrusion rate was 25 kg/hr. Finally, the pellets were dried in dry air at 80° C. for 16 hours to obtain EVOH12.

TABLE 3

| | Constitution of EVOH | | Constitution of EVOH resin composition | | | | |
|---|---|---|---|---|---|---|---|
| | Et (mol %) | DS (%) | AA (ppm) | PO$_4$ (ppm) | H$_3$BO$_3$ (ppm) | Na (ppm) | Mg (ppm) |
| EVOH1 | 32 | 99.5 | 70 | 100 | 180 | 230 | 0 |
| EVOH2 | 32 | 99.5 | 110 | 60 | 0 | 190 | 0 |
| EVOH3 | 32 | 99.5 | 80 | 100 | 2050 | 220 | 0 |
| EVOH4 | 32 | 99.5 | 250 | 120 | 0 | 110 | 55 |
| EVOH5 | 32 | 99.5 | 70 | 100 | 175 | 400 | 0 |
| EVOH6 | 32 | 99.5 | 1000 | 80 | 185 | 200 | 0 |
| EVOH7 | 32 | 99.5 | 0 | 80 | 180 | 210 | 0 |
| EVOH8 | 32 | 99.5 | 70 | 0 | 180 | 200 | 0 |
| EVOH9 | 32 | 99.5 | 80 | 720 | 175 | 200 | 0 |
| EVOH10 | 60 | 99.6 | 100 | 90 | 0 | 190 | 0 |
| EVOH11 | 20 | 99.5 | 105 | 90 | 94 | 210 | 0 |
| EVOH12 | 34.4 | 98.9 | 120 | 70 | 144 | 200 | 0 |

Et: Ethylene content
DS: Degree of saponification
AA: Acetic acid
PO$_4$: Phosphoric salt (in terms of the phosphoric radical)
H$_3$BO$_3$: Boric acid (in terms of the boron element)
Na, Mg: Sodium or magnesium salt (in terms of metals)

TABLE 4

|  | Tpm (° C.) | MI (g/10 min) | Density (g/cm$^3$) |
|---|---|---|---|
| EVOH1 | 183 | 1.7 | 1.180 |
| EVOH2 | 183 | 4.8 | 1.176 |
| EVOH3 | 183 | 0.01 | 1.177 |
| EVOH4 | 183 | 5.0 | 1.174 |
| EVOH5 | 183 | 1.7 | 1.178 |
| EVOH6 | 183 | 1.5 | 1.175 |
| EVOH7 | 183 | 1.7 | 1.174 |
| EVOH8 | 183 | 1.7 | 1.181 |
| EVOH9 | 183 | 1.6 | 1.182 |
| EVOH10 | 136 | 12.0 | 1.069 |
| EVOH11 | 205 | 1.1 | 1.222 |
| EVOH12 | 183, 156 | 2.1 | 1.165 |

MI: Melt index at 190° C., 2160 g loaded
MI of EVOH11 was calculated by extrapolation to 190° C.

Example 1

Using PET1 and EVOH1, two-resin three-layer closed-end parisons of PET1/EVOH1/PET1 were produced through coinjection molding with a KORTEC/HUSKY's coinjection-molding machine, SL160 Model (for quadruple molding). In this process, the injection cylinder temperature on the PET side was 280° C. and that on the EVOH side was 210° C.; the temperature of the hot runner block at which PET1 and EVOH1 form a combined flow was 270° C.; the injection mold core temperature was 10° C.: and the injection mold cavity temperature was 10° C. The injection rates and the injection amount were controlled so the thickness ratio of the PES layer to the EVOH layer of the container could be 95/5.

The parisons were visually checked. The parisons were not discolored and had no streaks, and the leading edge of EVOH1 at the mouth of each closed-end parison was good. The constitution and the test result of the closed-end parisons are given in Table 5.

Next, using a CRUPP CORPOPLAST MASCHINEN-BAU's stretch blow-molding machine, LB01 Model (for single molding of 530 ml), the closed-end parison was heated so that its surface temperature could be 105° C., and this was blow-molded under stretch to give a two-resin three-layer coinjection stretch blow molded container. The container obtained thereby was cut around its body, and the thickness ratio of the layers PET1 and EVOH1 to the overall layer thickness was measured. The results are given in Table 6. In addition, the layers were cut out separately and analyzed like the starting materials. The results are given in Table 7, Table 8 and Table 9.

Further, the impact delamination frequency, the haze, and the oxygen transmission rate of the container were measured. In addition, the container was checked visually. Streaks, gels, and fish eyes were not found in the container, and it had a good appearance. The evaluation results are given in Table 10.

To confirm the long-run workability of the container, the samples were tested for continuous 1000 cycles of coinjection stretch blow molding. After the test, the mold was visually checked to determine how and to what degree it was soiled. No soiling was found in the mold.

To confirm the thermal stability of EVOH1, two-resin three-layer parisons were produced in the same manner as above except that PET1 and EVOH1 were maintained in the hot runner block for 10 minutes. Though slightly yellowed, the parisons had no streaking and had a good appearance. The leading edge of the EVOH resin composition layer at the mouth of the closed-end parisons was also good. The appearances of the containers obtained through stretch blow molding of the closed-end parisons were observed. The containers did not have streaks, gels, and fish eyes, and had a good appearance. The evaluation results are given in Table 11.

Example 2

Two-resin three-layer closed-end parisons of PET1/EVOH1/PET1 were formed in the same manner as in Example 1, except that the injection rates and the injection amounts were varied so that the thickness ratio of the PES layer to the EVOH layer of the containers could be 92/8. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Example 3

Two-resin three-layer closed-end parisons were formed in the same manner as in Example 1, except EVOH12 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 1

Two-resin three-layer closed-end parisons of PET1/EVOH1/PET1 were formed in the same manner as in Example 1 except that the injection rates and the injection amounts were varied so that the thickness ratio of the PES layer to the EVOH layer of the containers could be 99.2/0.8. The constitution of the closed-end parisons is given in Table 5. Next, these were subjected to stretch blow molding in the same manner as in Example 1 to give two-resin three-layer coinjection stretch blow molded containers. The containers were visually checked, and it was found that their bodies partly lacked the EVOH1 layer. Accordingly, it was determined that the containers would be unsuitable for practical use and were omitted from further evaluation tests. The reason for the partial lack of EVOH1 is that the amount of the EVOH resin composition injected was too small and therefore the residence time of the composition in the hot runner increased.

Comparative Example 2

Two-resin three-layer closed-end parisons of PET1/EVOH1/PET1 were formed in the same manner as in Example 1, except that the injection rates and the injection amounts were varied so that the thickness ratio of the PES layer to the EVOH layer of the containers could be 85/15. The constitution of the closed-end parisons is given in Table 5. Next, these were sub j acted to stretch blow molding in the same manner as in Example 1 to give two-resin three-layer coinjection stretch blow molded containers. The containers were visually checked, and their bodies had remarkable streaks caused by the unevenly stretched EVOH 1 layer therein. Accordingly, it was judged that the containers would be unsuitable for practical use, and were omitted from further evaluation tests.

Comparative Example 3

Two-resin three-layer closed-end parisons were formed in the same manner as in Example 1, except PET2 was used in place of PET1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 4

Two-resin three-layer closed-end parisons were formed in the same manner as in Example 1, except PET3 was used in place of PET1. The constitution of the closed-end parisons is given in Table 5. Since the closed-end parisons appeared extremely yellow in color, they were not subjected to stretch blow molding. The constitutive layers were separated and individually inspected. EVOH1 did not discolor, but yellowed PET3 greatly.

Comparative Example 5

Two-resin three-layer closed-end parisons were formed in the same manner as in Example 1, except EVOH2 was used in place of EVOH 1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 6

Molding two-resin three-layer closed-end parisons was tried in the same manner as in Example excepte EVOH3 was used in place of EVOH1. However, since the melt index of EVOH3 was extremely low, moldings having a uniform EVOH layer could not be obtained. Accordingly it was determined that the parisons could not give containers suitable for practical use and were omitted from further evaluation tests.

Comparative Example 7

Two-resin three-layer closed-end parisons were formed in the same manner as in Example 1, except EVOH4 was used in place of EVOH1. The leading edges of the closed-end parisons were significantly disordered as shown in FIG. 2. The constitution and the evaluation results of the closed-end parisons are given in Table 5. Next, these were subjected to stretch blow molding in the same manner as in Example 1 to give two—resin three-layer coinjection stretch blow molded containers. Also in the same manner as in Example 1, these containers were tested and evaluated. The results are given in Tables 6 to 11.

Comparative Example 8

Two-resin three-layer closed-end parisons were farmed in the same manner as in Example 1, except EVOH5 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 9

Two-resin three-layer closed-end parisons were formed in the same manner as in Example 1, except EVOH6 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 10

Two-resin three-layer closed-end parisons were formed in the same manner as in Example 1, except EVOH7 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 11

Two-resin three-layer closed-end parisons were formed in the same manner as in Example 1, except EVOH8 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 12

Two-resin three-layer closed-end parisons were formed in the same manner as in Example 1, except EVOH9 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 13

Two-resin three-layer closed-end parisons were formed in the same manner as in Example 1, except EVOH10 was used in place of EVOH1. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

Comparative Example 14

Two-resin three-layer closed-end parisons were formed in the same manner as in Example 1, except EVOH11 was used in place of EVOH1 and the injection cylinder temperature on the EVOH side was varied to 220° C. The constitution and the evaluation results of the closed-end parisons are given in Table 5. Next, these were subjected to stretch blow molding in the same manner as in Example 1 to give two-resin three-layer coinjection stretch blow molded containers. Also in the same manner as in Example 1, these containers were tested and evaluated. The results are given in Tables 6 to 11.

TABLE 5

| | Constitution of parison | | | Evaluation of parison | | |
|---|---|---|---|---|---|---|
| | PES (A) | EVOH (B) | Layers | Color | Streak | Leading edge |
| Ex. 1 | PET1 | EVOH1 | A/B/A | 0 | 0 | 0 |
| Ex. 2 | PET1 | EVOH1 | A/B/A | 0 | 0 | 0 |
| Ex. 3 | PET1 | EVOH12 | A/B/A | 0 | 0 | 0 |
| CoEx. 1 | PET1 | EVOH1 | A/B/A | — | — | — |
| CoEx. 2 | PET1 | EVOH1 | A/B/A | — | — | — |
| CoEx. 3 | PET2 | EVOH1 | A/B/A | 0 | 0 | 0 |
| CoEx. 4 | PET3 | EVOH1 | A/B/A | — | — | — |
| CoEx. 5 | PET1 | EVOH2 | A/B/A | 0 | 0 | 0 |
| CoEx. 6 | PET1 | EVOH3 | A/B/A | — | — | — |
| CoEx. 7 | PET1 | EVOH4 | A/B/A | 0 | X | X |
| CoEx. 8 | PET1 | EVOH5 | A/B/A | 0 | Δ | Δ |
| CoEx. 9 | PET1 | EVOH6 | A/B/A | 0 | X | X |
| CoEx. 10 | PET1 | EVOH7 | A/B/A | 0 | X | X |
| CoEx. 11 | PET1 | EVOH8 | A/B/A | 0 | X | X |
| CoEx. 12 | PET1 | EVOH9 | A/B/A | 0 | Δ | Δ |
| CoEx. 13 | PET1 | EVOH10 | A/B/A | 0 | X | X |
| CoEx. 14 | PET1 | EVOH11 | A/B/A | X | X | 0 |

Color: 0- Not discolored, X- Discolored
Streak: 0- No streaking, Δ- A little streaking, X- A lot of streaking
Leading edge: 0- Good, Δ- Relatively bad, X- Bad

TABLE 6

| | Thickness ratio of PES (A) | Thickness ratio of EVOH (B) |
|---|---|---|
| Ex. 1 | 0.95 | 0.05 |
| Ex. 2 | 0.92 | 0.08 |
| Ex. 3 | 0.95 | 0.05 |
| CoEx. 1 | — | — |
| CoEx. 2 | — | — |
| CoEx. 3 | 0.95 | 0.05 |
| CoEx. 4 | — | — |
| CoEx. 5 | 0.95 | 0.05 |
| CoEx. 6 | — | — |
| CoEx. 7 | 0.95 | 0.05 |
| CoEx. 8 | 0.95 | 0.05 |
| CoEx. 9 | 0.95 | 0.05 |

TABLE 6-continued

|  | Thickness ratio of PES (A) | Thickness ratio of EVOH (B) |
|---|---|---|
| CoEx. 10 | 0.95 | 0.05 |
| CoEx. 11 | 0.96 | 0.05 |
| CoEx. 12 | 0.95 | 0.05 |
| CoEx. 13 | 0.97 | 0.03 |
| CoEx. 14 | 0.95 | 0.05 |

TABLE 7

|  | Constitution of PET | | Properties of PET | | | | |
|---|---|---|---|---|---|---|---|
|  | —COOH μeq/g | CT Wt % | IV dl/g | Tc °C. | Tmg °C. | Tpm °C. | Density g/cm³ |
| Ex. 1 | 26 | 0.37 | 0.80 | 151 | 80 | 253 | 1.369 |
| Ex. 2 | 26 | 0.37 | 0.80 | 151 | 80 | 253 | 1.369 |
| Ex. 3 | 26 | 0.37 | 0.80 | 151 | 80 | 253 | 1.369 |
| CoEx. 1 | — | — | — | — | — | — | — |
| CoEx. 2 | — | — | — | — | — | — | — |
| CoEx. 3 | 27 | 0.96 | 0.68 | 154 | 80 | 252 | 1.365 |
| CoEx. 4 | — | — | — | — | — | — | — |
| CoEx. 5 | 26 | 0.37 | 0.80 | 151 | 80 | 253 | 1.369 |
| CoEx. 6 | 26 | 0.37 | 0.80 | 151 | 80 | 253 | 1.369 |
| CoEx. 7 | 26 | 0.37 | 0.80 | 151 | 80 | 253 | 1.369 |
| CoEx. 8 | 26 | 0.37 | 0.80 | 151 | 80 | 253 | 1.369 |
| CoEx. 9 | 26 | 0.37 | 0.80 | 151 | 80 | 253 | 1.369 |
| CoEx. 10 | 26 | 0.37 | 0.80 | 151 | 80 | 253 | 1.369 |
| CoEx. 11 | 26 | 0.37 | 0.80 | 151 | 80 | 253 | 1.369 |
| CoEx. 12 | 26 | 0.37 | 0.80 | 151 | 80 | 253 | 1.369 |
| CoEx. 13 | 26 | 0.37 | 0.80 | 151 | 80 | 253 | 1.369 |
| CoEx. 14 | 26 | 0.37 | 0.80 | 151 | 80 | 253 | 1.369 |

—COOH: Terminal COOH
CT: Cyclic trimer
IV: Intrinsic Viscosity
Tc: Cold-crystallization temperature

TABLE 8

|  | Constitution of EVOH | | Constitution of EVOH resin composition | | | | |
|---|---|---|---|---|---|---|---|
|  | Et mol % | DS mol % | Acetic acid ppm | PO₄ ppm | Boric acid ppm | Na salt ppm | Mg salt ppm |
| Ex. 1 | 32 | 99.5 | 70 | 100 | 180 | 230 | 0 |
| Ex. 2 | 32 | 99.5 | 70 | 100 | 180 | 230 | 0 |
| Ex. 3 | 34 | 98.9 | 120 | 70 | 144 | 200 | 0 |
| CoEx. 1 | — | — | — | — | — | — | — |
| CoEx. 2 | — | — | — | — | — | — | — |
| CoEx. 3 | 32 | 99.5 | 70 | 100 | 180 | 230 | 0 |
| CoEx. 4 | — | — | — | — | — | — | — |
| CoEx. 5 | 32 | 99.5 | 110 | 60 | 0 | 190 | 0 |
| CoEx. 6 | — | — | — | — | — | — | — |
| CoEx. 7 | 32 | 99.5 | 250 | 120 | 0 | 110 | 55 |
| CoEx. 8 | 32 | 99.5 | 70 | 100 | 175 | 400 | 0 |
| CoEx. 9 | 32 | 99.5 | 1000 | 80 | 185 | 200 | 0 |
| CoEx. 10 | 32 | 99.5 | 0 | 80 | 180 | 210 | 0 |
| CoEx. 11 | 32 | 99.5 | 70 | 0 | 180 | 200 | 0 |
| CoEx. 12 | 32 | 99.5 | 80 | 720 | 175 | 200 | 0 |
| CoEx. 13 | 60 | 99.6 | 100 | 90 | 0 | 190 | 0 |
| CoEx. 14 | 20 | 99.5 | 105 | 90 | 94 | 210 | 0 |

Et: Ethylene content
DS: Degree of saponification
PO₄: Phosphoric salt (in terms of the phosphoric radical)
Boric acid: in terms of the boron element
Na or Mg salt: Sodium or magnesium salt (in terms of metals)

TABLE 9

|  | Properties of EVOH resin composition | | |
|---|---|---|---|
|  | Tpm °C. | MI g/10 min | Density g/cm³ |
| Ex. 1 | 183 | 1.7 | 1.178 |
| Ex. 2 | 183 | 1.7 | 1.180 |
| Ex. 3 | 183, 156 | 2.1 | 1.166 |
| CoEx. 1 | — | — | — |
| CoEx. 2 | — | — | — |
| CoEx. 3 | 183 | 1.7 | 1.180 |
| CoEx. 4 | — | — | — |
| CoEx. 5 | 183 | 4.8 | 1.176 |
| CoEx. 6 | — | — | — |
| CoEx. 7 | 183 | 5.0 | 1.174 |
| CoEx. 8 | 183 | 1.7 | 1.178 |
| CoEx. 9 | 183 | 1.5 | 1.175 |
| CoEx. 10 | 183 | 1.7 | 1.174 |
| CoEx. 11 | 183 | 1.7 | 1.181 |
| CoEx. 12 | 183 | 1.6 | 1.182 |
| CoEx. 13 | 136 | 12.0 | 1.069 |
| CoEx. 14 | 205 | 1.1 | 1.222 |

MI: Melt index at 190° C., 2160 g loaded
MI in CoEx. 14 was calculated by extrapolation to 190° C.

TABLE 10

|  | Impact delamination frequency (%) | Haze % | Oxygen transmission rate ml/(container · day · atm) | Streak | Gel | Bubble |
|---|---|---|---|---|---|---|
| Ex. 1 | 11 | 2.3 | 0.006 | 0 | 0 | 0 |
| Ex. 2 | 5 | 3.1 | 0.002 | 0 | 0 | 0 |
| Ex. 3 | 3 | 4.5 | 0.008 | 0 | 0 | 0 |
| CoEx. 1 | — | — | — | — | — | — |
| CoEx. 2 | — | — | — | — | — | — |
| CoEx. 3 | 35 | 4.6 | 0.006 | 0 | 0 | 0 |
| CoEx. 4 | — | — | — | — | — | — |
| CoEx. 5 | 23 | 3.5 | 0.006 | 0 | 0 | 0 |
| CoEx. 6 | — | — | — | — | — | — |
| CoEx. 7 | 75 | 4.5 | 0.006 | Δ | 0 | Δ |
| CoEx. 8 | 60 | 4.1 | 0.006 | Δ | 0 | Δ |
| CoEx. 9 | 42 | 3.9 | 0.006 | Δ | 0 | 0 |
| CoEx. 10 | 71 | 4.1 | 0.006 | Δ | 0 | Δ |
| CoEx. 11 | 66 | 4.3 | 0.006 | Δ | 0 | 0 |

TABLE 10-continued

|  | Impact delamination frequency (%) | Haze % | Oxygen transmission rate ml/(container · day · atm) | Streak | Gel | Bubble |
|---|---|---|---|---|---|---|
| CoEx. 12 | 55 | 5.1 | 0.006 | Δ | 0 | 0 |
| CoEx. 13 | 80 | 6.2 | 0.050 | X | 0 | 0 |
| CoEx. 14 | 95 | 4.8 | 0.004 | X | X | 0 |

Streak, Gel, and Bubble:
0: does not exist
Δ: a little exists
X: a lot exists

TABLE 11

|  | Long-run workability | Evaluation of parison (with material stay) | | | Evaluation of container (with material stay) | | |
|---|---|---|---|---|---|---|---|
|  |  | Color | Streak | Leading edge | Streak | Gel | Bubble |
| Ex. 1 | 0 | 0 | 0 | 0 | 0 | 0 | 0 |
| Ex. 2 | 0 | 0 | 0 | 0 | 0 | 0 | 0 |
| Ex. 3 | 0 | 0 | 0 | 0 | 0 | 0 | 0 |
| CoEx. 1 | — | — | — | — | — | — | — |
| CoEx. 2 | — | — | — | — | — | — | — |
| CoEx. 3 | X | 0 | 0 | 0 | 0 | 0 | 0 |
| CoEx. 4 | — | — | — | — | — | — | — |
| CoEx. 5 | 0 | Δ | Δ | Δ | Δ | 0 | 0 |
| CoEx. 6 | — | — | — | — | — | — | — |
| CoEx. 7 | 0 | X | X | X | X | 0 | X |
| CoEx. 8 | 0 | X | X | X | X | 0 | 0 |
| CoEx. 9 | 0 | X | X | X | X | X | 0 |
| CoEx. 10 | 0 | X | X | X | X | 0 | X |
| CoEx. 11 | 0 | X | X | X | X | 0 | X |
| CoEx. 12 | 0 | X | Δ | X | X | X | 0 |
| CoEx. 13 | 0 | 0 | X | X | X | 0 | 0 |
| CoEx. 14 | 0 | X | Δ | X | X | X | X |

Color: 0- Not discolored, X- Discolored
Streak, Gel, and Bubble: 0- Does not exist, Δ- A little exists, X- A lot exists
Leading edge: 0- Good, Δ- Relatively Bad, X- Bad
Long-run workablility: 0- Good, X- Bad The results above confirm that the coinjection stretch blow molded containers in accordance with the present invention (Examples 1 to 3) have good impact delamination resistance, good transparency and good appearances, and their long-run workability is good. In contrast, the containers of Comparative Examples 1 to 14 do not satisfy the requirements of the present invention, and as such are inferior to the inventive coinjection stretch blow molded containers.

The coinjection stretch blow molded container of the present invention has excellent gas barrier properties against, for example: oxygen and carbon dioxide; moisture-proofing properties; flavor-retention properties; flavor-barrier properties; and impact delamination resistance. In addition, the container of the present invention has a good appearance and can be stably produced in long-run working lines. Moreover, the coinjection stretch blow molded container of the present invention is suitable for use as a container for drinks, foods, cosmetics, etc.

Numerous modifications and variations on the present invention are possible in light of the above teachings. It is, therefore, to be understood that within the scope of the accompanying claims, the present invention may be practiced otherwise than as specifically described herein.

What we claim is:

1. A coinjection stretch blow molded container comprising: a layer of thermoplastic polyester (A), and a layer of an ethylene-vinyl alcohol copolymer resin composition (B);

wherein the layer of thermoplastic polyester (A) has an intrinsic viscosity of from 0.70 to 0.90 dl/g and a cyclic trimer content of at most 0.50% by weight of the overall weight of the layer of thermoplastic polyester (A);

wherein the layer of an ethylene-vinyl alcohol copolymer resin composition (B) comprises an ethylene-vinyl alcohol copolymer (b1) having an ethylene content of from 20 to 60 mol % and a degree of saponification of at least 90 mol %, acetic acid (b2), a phosphoric compound (b3) and a boron compound (b4), wherein:

the content ratio of acetic acid (b2) to the ethylene-vinyl alcohol copolymer (b1) is from 30 to 250 ppm, the content ratio of the phosphoric compound (b3) to the ethylene-vinyl alcohol copolymer (b1) is from 5 to 500 ppm in terms of the phosphoric radical, the content ratio of the boron compound (b4) to the ethylene-vinyl alcohol copolymer (b1) is from 20 to 2000 ppm in terms of the boron element, wherein the layer of an ethylene-vinyl alcohol copolymer resin composition (B) further comprises an alkali metal salt (b5), wherein the content ratio of the alkali metal salt (b5) to the ethylene-vinyl alcohol copolymer (b1) is at most 300 ppm in terms of the alkali metal and further comprises an alkaline earth metal salt (b6), and wherein the content ratio of the alkaline earth metal salt (b6) to the ethylene-vinyl alcohol copolymer (b1) is at most 10 ppm in terms of the alkaline earth metal, the melt index at 190° C., 2160 g loaded, of the layer of an ethylene-vinyl alcohol copolymer resin composition (B) is from 0.1 to 10 g/10 mm; and wherein the thickness ratio of the layer of thermoplastic polyester (A) to the layer of an ethylene-vinyl alcohol copolymer resin composition (B) in the body of the container is from 90/10 to 99/1.

2. The coinjection stretch blow molded container as claimed in claim 1, wherein the content ratio of the alkaline earth metal salt (b6) to the ethylene-vinyl alcohol copolymer (b1) in the layer of an ethylene-vinyl alcohol copolymer resin composition (B) is at most 5 ppm in terms of the alkaline earth metal.

3. The coinjection stretch blow molded container as claimed in claim 1, wherein the cold-crystallization temperature of the layer of thermoplastic polyester (A) is from 120 to 180° C.

4. The coinjection stretch blow molded container as claimed in claim 1, wherein the density of the layer of thermoplastic polyester (A) is from 1.35 to 1.39 g/cm$^3$.

5. The coinjection stretch blow molded container as claimed in claim 1, wherein the density of the layer of an ethylene-vinyl alcohol copolymer resin composition (B) is from 1.11 to 1.20 g/cm$^3$.

6. The coinjection stretch blow molded container as claimed in claim 1, wherein the percentage of impact delamination is at most 20%.

7. The coinjection stretch blow molded container as claimed in claim 1, wherein the body of the container has a haze of at most 5%.

8. The coinjection stretch blow molded container as claimed in claim 1, further comprising a recovery layer and/or an adhesive layer.

9. The coinjection stretch blow molded container as claimed in claim 1, wherein the layer of thermoplastic polyester (A) and the layer of an ethylene-vinyl alcohol copolymer resin composition (B) have the following arrangement from the innermost layer to the outermost layer: A/B/A.

10. The coinjection stretch blow molded container as claimed in claim 1, wherein the layer of thermoplastic polyester (A) and the layer of an ethylene-vinyl alcohol copolymer resin composition (B) have the following arrangement from the innermost layer to the outermost layer: A/B/A/B/A.

11. The coinjection stretch blow molded container as claimed in claim 1, wherein the layer of thermoplastic polyester (A) comprises at least 70 mol % of polymers based on terephthalic acid units and/or ethylene glycol units.

12. The coinjection stretch blow molded container as claimed in claim 11, wherein the layer of thermoplastic polyester (A) further comprises not more than 30 mol % of one or more additional difunctional compound units selected from the group consisting of an aliphatic compound unit, an alicyclic compound unit, and an aromatic compound unit.

13. The coinjection stretch blow molded container as claimed in claim 11, wherein the layer of thermoplastic polyester (A) further comprises not more than 5 mol % of one or more monofunctional compound units.

14. The coinjection stretch blow molded container as claimed in claim 11, wherein the layer of thermoplastic polyester (A) further comprises not more than 0.5 mol % of one or more polyfunctional compound units.

15. The coinjection stretch blow molded container as claimed in claim 1, wherein the ethylene-vinyl alcohol copolymer (b1) further comprises one or more additional comonomers selected from the group consisting of an α-olefin, an unsaturated carboxylic acid, a vinylsilane compound, an unsaturated sulfonic acid, an alkylthiol, and a vinylpyrrolidone.

16. The coinjection stretch blow molded container as claimed in claim 1, wherein the phosphoric compound (b3) is selected from the group consisting of phosphoric acid, a primary phosphoric salt, a secondary phosphoric salt and a tertiary phosphoric salt.

17. The coinjection stretch blow molded container as claimed in claim 1, wherein the boron compound (b4) is selected from the group consisting of a boric acid, a boric ester, a boric salt, and a boron hydride.

18. The coinjection stretch blow molded container as claimed in claim 1, wherein the melting point of the layer of an ethylene-vinyl alcohol copolymer resin composition (B) is from 140 to 190° C.

19. The coinjection stretch blow molded container as claimed in claim 1, wherein the layer of an ethylene-vinyl alcohol copolymer resin composition (B) further comprises one or more additives selected from the group consisting of a thermal stabilizer, an UV absorbent, an antioxidant, a colorant, a filler, a polyamide resin, and a polyolefin resin.

* * * * *

UNITED STATES PATENT AND TRADEMARK OFFICE
CERTIFICATE OF CORRECTION

| | | |
|---|---|---|
| PATENT NO. | : 7,615,272 B2 | Page 1 of 1 |
| APPLICATION NO. | : 10/367833 | |
| DATED | : November 10, 2009 | |
| INVENTOR(S) | : Masakazu Nakaya et al. | |

It is certified that error appears in the above-identified patent and that said Letters Patent is hereby corrected as shown below:

On the Title page,

Item [*] Notice:   Subject to any disclaimer, the term of this patent is extended or adjusted under 35 U.S.C. 154(b) by 1259 days.

Delete the phrase "by 1259 days" and insert -- by 1413 days --

Signed and Sealed this

Thirty-first Day of August, 2010

David J. Kappos
*Director of the United States Patent and Trademark Office*